United States Patent [19]
Soland et al.

[11] Patent Number: 4,461,450
[45] Date of Patent: Jul. 24, 1984

[54] REMOTE CONTROL CHOKE

[75] Inventors: John P. Soland, Spring; Charles D. Bridges, Houston, both of Tex.

[73] Assignee: Combustion Engineering, Inc., Windsor, Conn.

[21] Appl. No.: 392,322

[22] Filed: Jun. 25, 1982

[51] Int. Cl.³ .................... F16K 31/363; F16K 51/00
[52] U.S. Cl. .................................. 251/63.5; 251/285
[58] Field of Search ........................ 251/62, 63.5, 285

[56] References Cited
U.S. PATENT DOCUMENTS

| | | | |
|---|---|---|---|
| 3,331,583 | 7/1967 | Baker | 251/63.5 |
| 3,499,456 | 3/1970 | Rerecich et al. | 251/63.5 |
| 3,978,884 | 9/1976 | Sundström | 251/285 |
| 4,054,156 | 10/1977 | Benson | 251/285 |

FOREIGN PATENT DOCUMENTS 910339 11/1962 United Kingdom ............... 251/63.5

Primary Examiner—Alan Cohan
Assistant Examiner—John A. Rivell
Attorney, Agent, or Firm—Cushman, Darby & Cushman

[57] ABSTRACT

There is provided a choke having an adjustable stop for absolutely limiting its degree of openness and a pressurized fluid-operated piston connected to the valve stem which normally is acted-on by differential pressure to maintain the valve open to the full extent permitted by engagement of the stem with the stop. A mechanical assistance device is provided for tending to close the valve and this device may be provided with a visual indicator from which, by inspection, one may tell the degree of openness of the valve. Remotely operable and on-site mechanical devices are shown provided for adjusting the absolute stop.

7 Claims, 3 Drawing Figures

REMOTE CONTROL CHOKE

BACKGROUND OF THE INVENTION

As an oil/gas well or other comparably deep well is being drilled wellhead equipment is progressively assembled at the mouth, to mechanically support strings of casing and tubing run into and hung in the well, to permit mud and other fluids to be circulated into the well, to permit the controlled recovery of fluids including cuttings from the well without contaminating the water or land in the vicinity of the wellhead, to prevent sea or lake water from flowing into the well in early stages, and to control subterranean pressure. This last-mentioned purpose becomes progressively more important as the well is drilled deeper. Subterranean pressures in communication with the well bore commonly reach 5,000 p.s.i., and in deeper wells, may reach up to 30,000 p.s.i. or so.

Quite obviously it would not be feasible to construct an entire production, collection and storage system downstream of the wellhead to withstand such high pressures, especially when they may not remain steady over time, but may fluctuate somewhat erratically.

The key is to provide the wellhead equipment assembly with a pressure step-down valve, generally further upstream than all usually used but any in-the-well downhole valves, a valve which may be controlled as to its absolute degree of opening, in which the normal case is open only slightly, in which the relative degree of opening (up to the set maximum degree) is responsive to the upstream and downstream pressures, and which may be absolutely closed. The wear conditions to which the seats and other valve surfaces between which the well fluids flow when such a valve is slightly open are extreme. Accordingly, these valves, which are called chokes have developed separately as a special sub-type of valves.

With completed, producing wells now often located at inaccessible locations it has become common to tend several wells from a common control center, using electronic pneumatic and/or hydraulic sensing, signalling and control means between each well and the common control center.

Accordingly, there is a need for chokes which can be used during drilling, completion, production and workover, which can be operated remotely, which have failsafe capabilities, and a relatively smooth curve of operating characteristics over their range of openness.

SUMMARY OF THE INVENTION

There is provided a choke having an adjustable stop for absolutely limiting its degree of openness and a pressurized fluid-operated piston connected to the valve stem which normally is acted-on by differential pressure to maintain the valve open to the full extent permitted by engagement of the stem with the stop. A mechanical assistance device is provided for tending to close the valve and this device may be provided with a visual indicator from which, by inspection, one may tell the degree of openness of the valve. Remotely operable and on-site mechanical devices are shown provided for adjusting the absolute stop.

The principles of the invention will be further discussed with reference to the drawings wherein a preferred embodiment is shown. The specifics illustrated in the drawings are intended to exemplify, rather than limit, aspects of the invention as defined in the claims.

DETAILED DESCRIPTION

Figure 1:
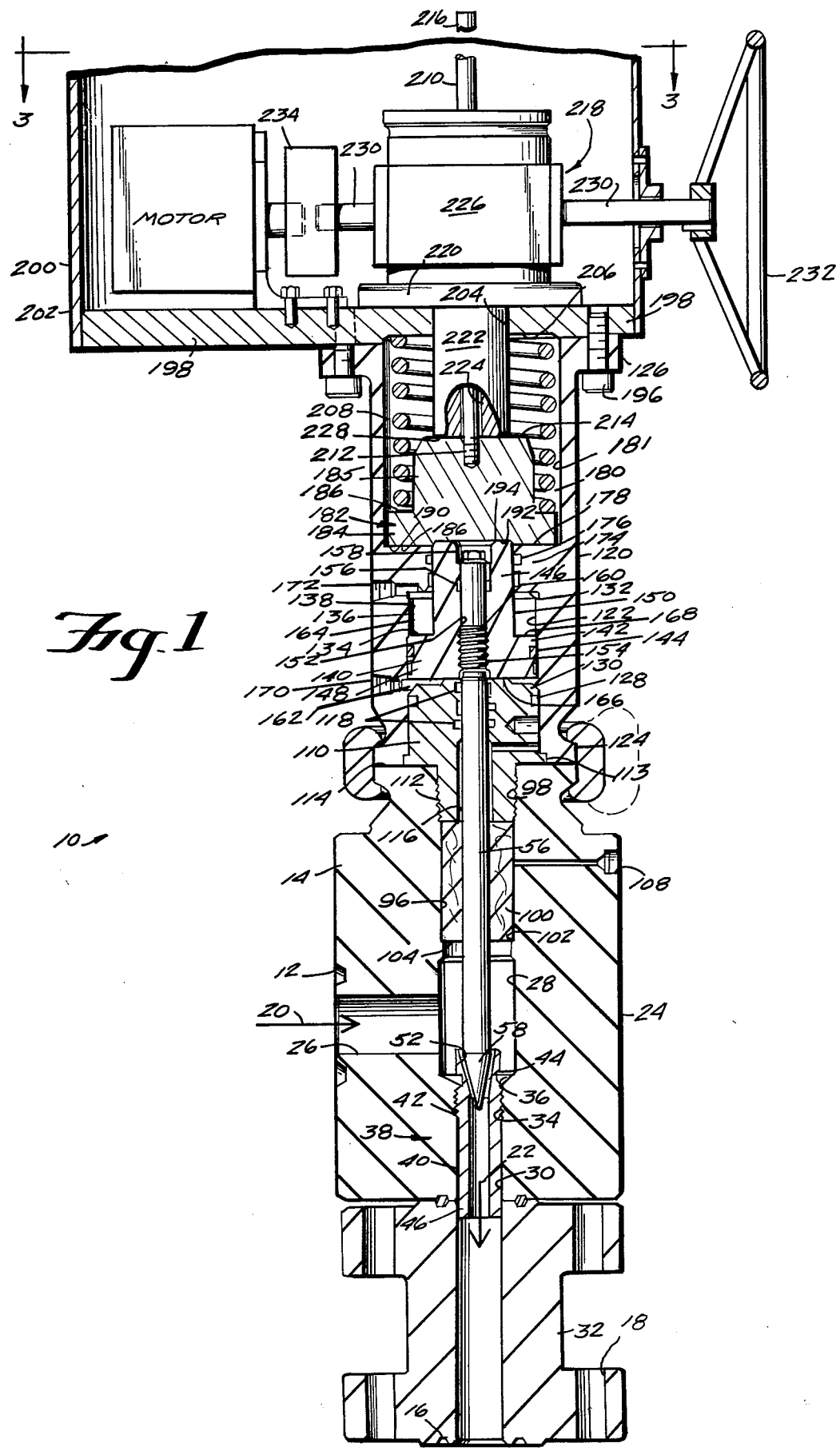
FIG. 1 is a fragmentary longitudinal sectional view of a typical portion of a wellhead equipment assembly e.g. part of a christmas tree, incorporating a choke provided in accordance with the principles of the present invention.
Figure 2:
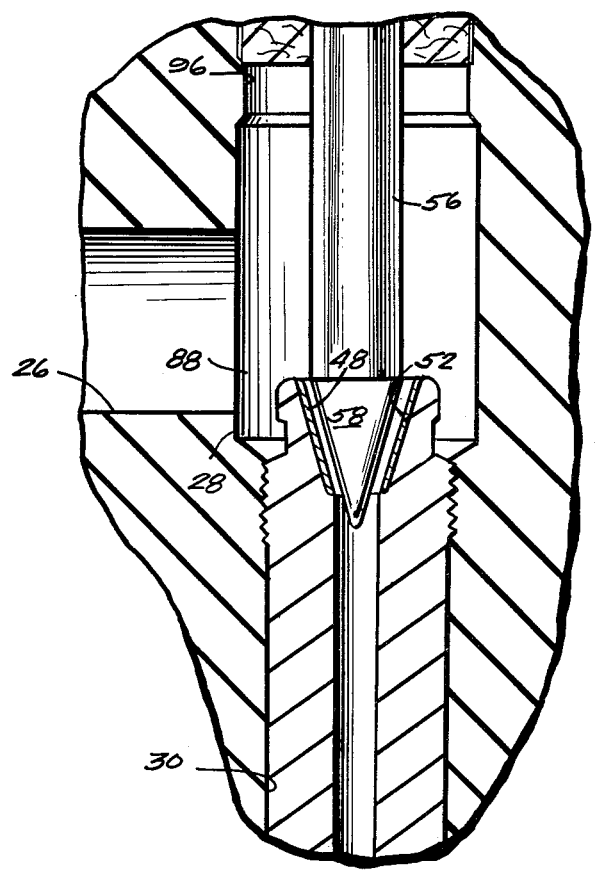
FIG. 2 is a larger scale sectional view of a portion of what is shown in FIG. 1.
Figure 3:
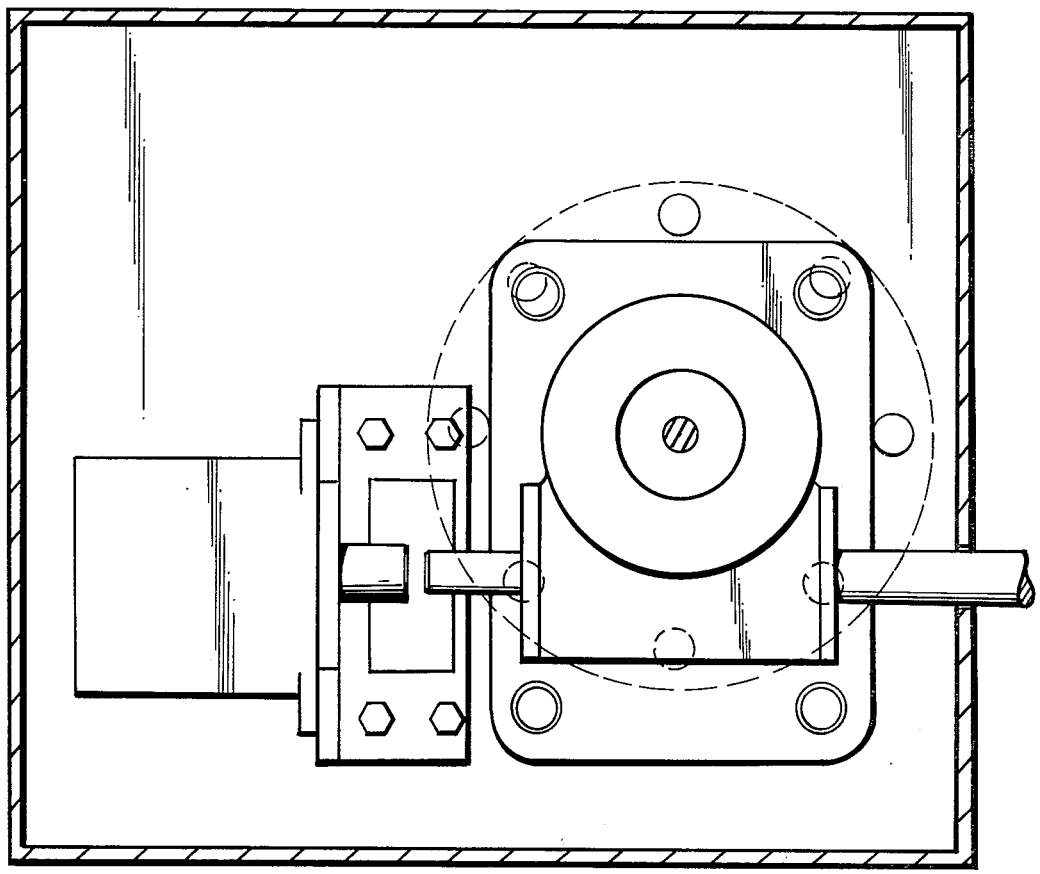
FIG. 3 is a fragmentary transverse sectional view taken substantially on line 3—3 of FIG. 1.

The subassembly 10 shown in FIG. 1 normally would form an intermediate portion of a larger assembly, e.g. a petroleum well christmas tree, although it could be used in a chemical process plant or the like where similar conditions must be controlled. In the petroleum well context, usually an upstream fluid conduit would be sealed and connected to the subassembly 10 at 12, 14, and a downstream fluid conduit would be sealed and connected to the subassembly 10 at 16, 18. The flow to be regulated by the choke 10 is generally indicated by the upstream, incoming arrow 20 and by the downstream, outgoing arrow 22.

The choke 10 is shown including a housing 24 having a transversally extending inlet passage 26 to a generally longitudinally extending, generally cylindrical chamber 28 from which a longitudinally extending outlet passage 30 extends. The outlet 30 is shown continuing through the bore of a spool 32 which is sealed and connected to the housing 24, the spool 32 being provided as a separate member for manufacturing and assembly convenience.

Adjacent its intersection with the chamber 28, the outlet passage 30 is threaded at 34 and has a frusto-conically tapering seat at 36. A tubular, replaceable choke bean 38 is shown sealingly fitted in this portion of the outlet passage 30. The choke bean 38 is replaceable for two main reasons: first to accommodate wear, and second because different designs of choke bean work best in a well at different stages in its life, i.e. during drilling, production and remedial workover. As shown, the choke bean 38 includes a tubular body 40 that is externally provided with a band of threading 42 and a tapering seat 44. These permit the choke bean, when received in the outlet passage to be mechanically connected by being threaded into place in the threading 34 and to be circumferentially metal-to-metal sealed on the seat 36. The tail 46 of the choke bean 38 extends past the juncture of the outlet passage 30 in the housing 24 with the continuation thereof in the bore of the spool 32.

The upstream end region of the bore of the choke bean 38 may be circumferentially hard-faced as shown at 48.

Projecting into the chamber 28 from the direction opposite the choke outlet 30 is a choke valve stem 56 which terminates in a tip 58, generally a conical tapering region. At its base, i.e. within the chamber 28 the tip 58 merges with the stem 56.

The choke valve stem tip 58 is constructed and arranged to sealingly circumferentially engage the hard-faced seat 52 of the choke bean. Accordingly the tip 58 can be withdrawn to a limited degree from seating engagement with the choke bean at 52, providing a flow path through the choke.

The outlet passage 30 of the housing 24 and the chamber 28 constitute two adjoining portions of a longitudinal bore 96 through which the stem 56 passes out of the housing 24. The end portion of the bore 96 is internally threaded at 98. The stem 56 is sealingly slidably journalled in the bore 96 by an annulus of packing 100 which seats at 102 to provide one end wall 104 of the chamber 28.

The housing 24 is shown provided with an injection port 108, e.g. for injecting plastic material for energizing or rejuvenating the packing 100.

A packing gland 110 is threaded into the bore 96 at 112 to axially compress and radially expand the annulus of packing. This packing gland 110 has an outer circumferential shoulder 113 which seats on the end 114 of the housing 24 to limit incursion of the packing gland into the bore 96. The packing gland 110 has a central bore 116 which passes the valve stem 56. The packing gland bore is sealed with the valve stem by sealing rings 118 received in respective radially inwardly opening grooves in the packing gland bore.

An actuator housing is shown provided at 120. It is a generally tubular spool-type element with a longitudinal bore 122 and end flanges 124,126. The one end 124 is clamped to the housing 24 end 114. The housing 120 bore 122 fits over the portion of the packing gland 110 which extends above the housing 24 bore 96. The packing gland 110 includes outer circumferential groove means which receive a sealing ring 128 for sealing between this bore-plugging portion 130 of the packing gland 110.

Axially somewhat further outward from the location of the packing gland 110, the bore 96 necks downward to provide an inwardly axially facing annular shoulder 132. This wall and the outer end wall 134 of the plugging portion of the packing gland 110 provide the opposite ends of a piston-receiving cylinder 136, the sidewall surface 138 is provided by the bore 122 wall.

A fluid piston 140 is slidingly received in the cylinder 136, with its cylindrical outer peripheral wall 142 in sliding, sealing relation with the sidewall surface 138, via a piston ring 144. The piston 140 includes a tail portion 146 that is coaxial with the head portion 148, but of smaller diameter. This tail portion 146 thus is provided with a cylindrical outer peripheral surface 150.

The piston 140 has a longitudinal bore 152 which is internally threaded at 154, provided with sealing rings at 156 and is enlarged to provide a socket 158 at its outer end.

The outer end portion of the choke valve stem 56 is threaded at 160 to thread into the piston bore 140 at 152. Axially outwardly of the threading 160, the valve stem 56 seals with the sealing rings 156 and an installation hexagonal head on the valve stem 56 is received in the socket 158.

Thus there is provided within the cylinder 136 an axially inner chamber 162 on one side of the piston 140 and an axially outer chamber 164 on the other side of the piston 140. The piston tail surface 150 is of greater diameter than the choke valve stem 56 within the cylinder 136, so the inner face 166 of piston 140 has a larger area than the outer face 168 thereof.

The actuator housing has a fluid port 170 provided therethrough to the inner chamber 162 and a fluid port 172 provided from the outer chamber 162 to the outside. Both the fluid ports 170 and 172 are connected in use to respective sources of control pressure. In the usual case, if the choke is to become or remain open, control pressures acting on opposite faces of the piston must be such as to force the piston to withdraw or remain withdrawn in the axially outward direction.

The outer peripheral surface 150 of the piston tail 146 is axially slidingly journalled in the necked-down cylindrical region 174 of the bore 96 outwardly of the shoulder 132. In this region a sealing ring 176 is provided to seal between the piston tail 146 and the bore 96.

Axially outwardly of the necked-down region 174, the bore 96 enlarges to a larger diameter at an axially outwardly facing annular shoulder 178 to provide spring chamber 180 having a circumferential sidewall 181 which extends to the end flange 126 of the actuator housing 120.

The surface 178 provides an annular floor for the spring chamber 180. A spring foot 182 is coaxially received in the spring chamber 180. The foot 182 includes an inwardly presented sole plate 184 and an outwardly presented tail piece 185. The sole plate has a sole 186 as an inner face and a shoulder 188 as an annular axially outer face. When the spring foot is projected as far into the spring chamber as it will go, the annular outer peripheral portion 190 of its sole 186 abuts the spring chamber floor 178.

The central portion 192 of the spring foot 182 sole 186 is positioned to be engaged by the axially outer end 194 of the piston 140, outside the cylinder 136.

The spring foot 182 is not tensilely connected to the piston 140 or choke valve stem 56, accordingly these members may move axially relative to one another provided they are not axially engaged.

The end flange 126 of the actuator housing 120 is shown bolted at 196 to the inner side of a radially extending plate 198. An equipment housing 200 is completed by an enclosure wall 202 provided about the periphery of the plate 198.

Coaxially with the choke valve stem 56 an opening 204 is provided through the plate 198. Accordingly, the wall 206 of the plate 198 circumferentially of the opening 204 provides the axially outer wall of the spring chamber 180. A compression coil spring 208 is shown coaxially received in the spring chamber 180 with its opposite ends engaged with the plate 198 and the plate 184, radially outwardly of the tail piece 185.

The tail piece 185 is shown provided with a coaxially outwardly projecting position indicator rod 210 which has an inner end 212 threaded socketed in the outer face 214 of the tail piece 185 and an outer portion 216 which extends out of the equipment housing 200 to where it can be visually inspected, whether at first hand or by remote sensing device.

Also connected to the plate 198 is an adjustable stop device 218. In the instance depicted it includes a worm-driven jack assembly which has its base plate 220 bolted to the equipment housing plate 198 and its axially adjustably positionable jack portion 222 coaxially projecting axially inwardly through the opening 204 into the spring chamber 180. The jack portion 222 is a cylindrical body that has a central bore 224 out through which the indicator rod freely passes.

Accordingly the worm and gear portion 226 of the assembly 218 has an input shaft which, if rotated in one sense causes the jack portion 222 to move axially outwardly and, if rotated in the opposite sense causes the jack portion 222 to move axially inwardly.

The jack portion 222 includes an axially inner end 228 designed to serve as a stop surface for the axially outer end wall 214 of the tail piece 185 of the spring foot 182.

The spring foot 182 may be moved axially inwardly until it engages the internal stop provided by the necked portion of the bore 96. The engagement of the end wall 214 of the spring foot 182 tail piece positively limits and stops further axially outward movement of the spring foot 182 and thus the piston 140, the choke valve stem 56 and its tip 58.

In the instance shown, the worm and gear input shaft 230 projects from the assembly in two directions. On one side it is shown equipped outside the enclosure 202 with a handwheel 232. On the other side, the shaft 230 is connected, via a suitable transmission 234 (e.g. a Morse "DRC", Model TL 5018 chain coupler, with cover), with a motor of any conventional type, e.g. a fluid motor powered by air or other gas, or by hydraulic fluid or other liquid, or an electric motor or the like, preferably conventionally provided with means for effecting and controlling its operation from a remote control station.

Accordingly, one may either by manually rotating the handwheel or by motorized rotation of the shaft 230 adjustably define the maximum degree to which the choke valve may open, from fully closed to various degrees of full openness. The jack device thus provides an adjustable piston stop. Rather than being worm and gear operated, this adjustable stop could be constituted by a hydraulically-operated jack, a pneumatically-operated jack, a piston-type stepping actuator, electric motor or other adjustable piston mounting and controllably moving device.

In operation, control fluid is applied to the piston 140 through the fluid ports 170 and 172 forcing the piston 140 outwardly to contact the piston stop 228 via the spring foot 182. This action draws the stem 56 axially outwards through the stem packing 100 and allows well fluid to flow through the orifice created by correspondingly drawing the tip 58 from its seat in the choke bean 38; this well fluid then exits through the choke outlet 30.

For failsafe operation, if pressure is vented through the fluid port 170, the choke valve stem tip 58 is forced to seat in the choke bean 38 as a result of differential pressure across the sealing area of the choke bean 38. Additional force to seat the tip 58 is provided by maintenance of fluid pressure through the fluid port 172 acting on the piston face in the outer chamber. The compression coil spring 208, acting between the spring foot sole plate 184 and the plate 198 wall 206, is designed to seat the tip 58 in the event that well fluid pressure, control pressure, is not adequate to provide sufficient seating force.

The device 10 provides for reliably positioning the choke tip and degree of permitted openness from a remote location. Thus, the choke 10 may be incorporated in an emergency shutdown system to be the first component to close, and thereby eliminate throttling across upstream valves. The choke may be vented to failsafe closed, as described hereinbefore, in the same manner as is familiar for gate valves provided with automatic hydraulic actuators. By properly conventionally instrumenting the device 10, the control panel at the remote control location may provide for orifice adjustment, open/close and failsafe operations. The control system can provide for a constant outlet pressure or a constant flow rate from the device 10.

As with other chokes, such as Gray Tool Company PBS chokes, the choke 10 may be interchangeably provided with a variety of different tips for adapting the choke 10 to provide its various functions, as a production choke, as a mud pump in or kill manifold choke or as a drilling choke, or the like.

The choke 10 may be made typically for service in the 5,000–30,000 p.s.i. range with orifices typically adjustable from 1⅛" to 3" depending upon service pressure.

It should now be apparent that the remote control choke as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A remote control choke, comprising:

housing means having longitudinal bore means, having fluid inlet passage means laterally joining said longitudinal bore means, and having a fluid outlet passage means from one end of the longitudinal bore means; a chamber within said housing means and connecting with said fluid inlet passage means and outlet passage means;

a choke valve stem projecting into said chamber through the other end of the longitudinal bore means; valve seat means provided in said chamber for said fluid outlet passage means; tip means provided on said choke valve stem within said chamber, and constructed and arranged to coact with said valve seat means to provide a closable, size-adjustable orifice for controlling fluid flow from said fluid inlet passage means to said fluid outlet passage means;

said choke valve stem having means providing a piston thereon, and said housing means including means providing a cylinder in which said piston is slidingly sealingly received; respective fluid ports connecting with said cylinder on both sides of said piston so that fluid pressure may be applied to either or both sides of the piston to tend to extend and withdraw the choke valve stem and thus adjust the effective size of the choke valve orifice;

an adjustable stop means having a base that is fixed in relation to said housing means and which includes an axially adjustably positionable jacking member having a shoulder providing a stop; means for axially adjusting the jacking member stop relative to the housing means;

the choke valve stem being arranged to bear against said stop when maximally extended as an adjustable limitation to further extension thereof and thus as a positive limitation on the size of said choke valve orifice;

the piston including a tail portion extending axially outwardly out of said cylinder through an annular neck provided in the longitudinal bore of said housing means;

means providing a spring chamber in said housing means; said annular neck opening into said spring member; a spring foot disposed in said spring chamber; means providing an outer end wall for said spring chamber; a compression coil spring engaged between said spring foot and said outer end wall; said spring being constructed and arranged to, by pushing axially inwardly on the piston tail portion, tend to force the choke to close;

said choke valve stem being arranged to bear against said stop by engagement of the piston tail portion with the spring foot and engagement of the spring foot with the stop;

there being a lack of tensile connection between the adjustable stop means and the choke valve stem.

2. The remote control choke of claim 1, wherein:

the jacking member has means providing a longitudinal bore therethrough; and the spring foot is centrally with a position indicating rod mounted thereto and extending out through said jacking member longitudinal bore.

3. A remote control choke, comprising:

housing means having longitudinal bore means, having fluid inlet passage means laterally joining said longitudinal bore means, and having a fluid outlet passage means from one end of the longitudinal bore means; a chamber within said housing means and connecting with said fluid inlet passage means and outlet passage means;

a choke valve stem projecting into said chamber through the other end of the longitudinal bore means; valve seat means provided in said chamber for said fluid outlet passage means; tip means provided on said choke valve stem within said chamber, and constructed and arranged to coact with said valve seat means to provide a closable, size-adjustable orifice for controlling fluid flow from said fluid inlet passage means to said fluid outlet passage means;

said choke valve stem having means providing a piston thereon, and said housing means including means providing a cylinder in which said piston is slidingly sealingly received; respective fluid ports connecting with said cylinder on both sides of said piston so that fluid pressure may be applied to either or both sides of the piston to tend to extend and withdraw the choke valve stem and thus adjust the effective size of the choke valve orifice;

an adjustable stop means having a base that is fixed in relation to said housing means and which includes an axially adjustably positionable jacking member having a shoulder providing a stop; means for axially adjusting the jacking member stop relative to the housing means;

the choke valve stem being arranged to bear against said stop when maximally extended as an adjustable limitation to further extension thereof and thus as a positive limitation on the size of said choke valve orifice;

the means for axially adjusting the jacking member stop relative to the housing means including a laterally projecting input shaft which, when reversibly manipulated causes said jacking member to be correspondingly moved axially inwardly and axially outwardly;

and means provided on said shaft for reversibly manipulating said shaft to thereby adjust said stop.

4. The remote control choke of claim 3, wherein:

said shaft is mounted for manipulation by rotation and said means provided on said shaft for reversibly rotating said shaft include both a handwheel for manually rotating said shaft and a motor for mechanically rotating said shaft.

5. The remote control choke of claim 4, wherein:
said motor is a pneumatically-operated motor.

6. The remote control choke of claim 4, wherein:
said motor is a hydraulically-operated motor.

7. The remote control choke of claim 4, wherein:
said motor is an electrically-operated motor.

* * * * *